(12) United States Patent
Stahl (10) Patent No.: US 6,998,633 B2
(45) Date of Patent: Feb. 14, 2006

(54) DEVICE AND METHOD FOR READING OUT INFORMATION STORED IN A STORAGE LAYER

(75) Inventor: Werner Stahl, Heimstetten (DE)

(73) Assignee: Agfa-Gevaert Healthcare GmbH, Leverkusen (DE)

( * ) Notice: Subject to any disclaimer, the term of this patent is extended or adjusted under 35 U.S.C. 154(b) by 378 days.

(21) Appl. No.: 10/610,455

(22) Filed: Jun. 30, 2003

(65) Prior Publication Data

US 2004/0104364 A1 Jun. 3, 2004

(30) Foreign Application Priority Data

Jul. 2, 2002 (EP) .................................. 02014627

(51) Int. Cl.
*G03B 42/08* (2006.01)

(52) U.S. Cl. ..................................... 250/589
(58) Field of Classification Search ..................... None
See application file for complete search history.

(56) References Cited

U.S. PATENT DOCUMENTS 6,507,039 B2 * 1/2003 Gebele et al. .............. 250/584
6,621,094 B2 * 9/2003 Yasuda ...................... 250/586
6,784,448 B2 * 8/2004 Neriishi et al. ............. 250/584
6,818,913 B2 * 11/2004 Yasuda et al. .............. 250/586
6,861,662 B2 * 3/2005 Chikugo ..................... 250/589

FOREIGN PATENT DOCUMENTS

| EP | 1 081 507 A2 | 3/2001 |
| EP | 02 01 4627 | 12/2002 |

\* cited by examiner

*Primary Examiner*—David Porta
*Assistant Examiner*—Marcus Taningco
(74) *Attorney, Agent, or Firm*—John A. Merecki; Robert A. Sabourin (57) ABSTRACT

A device and method for reading out information stored in a storage layer using a receiving device. The storage layer is supported on a support surface that is defined by an x-y plane and a relative movement is generated between the receiving device and the storage layer in the x direction. The receiving device or the storage layer is guided during the generation of the relative movement by a guide system on a guide surface. Using first and second partial guides, an interspacing is adjusted in a z direction that lies perpendicular to the x-y plane, on either side—viewed in the z direction—of the support surface. The guide surface is independent of the storage layer and the first and second partial guides are connected to one another and are pretensioned against one another, and act in a pincer-like manner on the support surface.

15 Claims, 10 Drawing Sheets

DEVICE AND METHOD FOR READING OUT INFORMATION STORED IN A STORAGE LAYER

FIELD OF THE INVENTION

The present invention relates to a device and a method for reading out information stored in a storage layer.

BACKGROUND OF THE INVENTION

Such a device and method are known from EP 1 081 507 A2. This reference discloses a device in which the receiving device is supported via an upper air cushion, which rests on the storage layer, relative to the storage layer. A lower air cushion is arranged between a transparent carrier material, on which the storage layer is arranged, and a radiation source. This further air cushion is integrated in a support that serves to guide the transparent carrier material and the storage layer mounted thereon. In this way the storage layer should be moved along the radiation source and the receiving device for the readout procedure. The air gap of the air cushion arranged above the storage layer is formed by a force equilibrium, on the one hand due to a pressure force exerted by the air in the direction of the receiving device, and on the other hand through the force of gravity that acts from the receiving device in the direction of the storage layer. It is proposed to use a spring that is secured to an outer border, for example the housing of the receiving device, and is arranged so that the force exerted by it acts in the direction of the storage layer and thus increases the compression force on the air layer in the air gap.

SUMMARY OF THE INVENTION

One object of the present invention is to develop a device and a method of the type mentioned in the introduction in such a way that one storage layer can be read out efficiently and accurately.

The invention is based on the knowledge that the distance between the storage layer and receiving device can then be maintained extremely precise if, contrary to the prior art, a first and second partial guide of the guide means are connected to one another in such a way that they act in a pincer-like manner on the reference surface. In other words, according to the invention the first and the second partial guide do not act independently of one another, but together form pincers. In this way thickness variations in particular or other unevennesses of the storage layer or of the storage layer together with a carrier material on which the storage layer may be mounted, can be taken into account in an optimal manner for the readout of stored information. A uniform, constant and very small distance between the storage layer and the receiving device can thus be achieved in a very advantageous manner.

Preferably the guide means is furthermore not guided on the surface of the storage layer, which may for example be formed of phosphorus. The storage layer is in practice not very suitable as a guide surface. This is due in particular to the roughness of the surface of the storage layer compared to the extreme smoothness that is required for guidance purposes. In order to understand this, it must be borne in mind that the distance is particularly preferably between 1 $\mu$m and 4 $\mu$m, wherein already a distance of 2 $\mu$m can lead to semi-fluid friction, in other words could scratch the guide means. When using a guide surface that does not constitute the storage layer, this may be formed extremely smoothly, for example of glass. In this way air cushions can advantageously be used without any problem to support the receiving device, which provides further advantages. Preferred as guide surfaces is the support surface itself, on which the storage layer is supported at least during the readout procedure, in particular—viewed in the feed direction—edge regions of the support surface, or also guide rails, along which the receiving device or the storage layer is guided at least during the execution of the relative movement. In this connection these guide rails are matched exactly to the course of the support surface for the storage layer. A very good accuracy during guidance is thereby achieved.

A particularly advantageous embodiment of the invention is achieved when, as guide surface for guiding the receiving device or the storage layer when reading out the storage layer, a guide surface is chosen such that its level in the direction perpendicular to the plane that is spanned by the support surface coincides as exactly as possible with the level of the support surface for the storage layer in the direction perpendicular to the plane of the support surface. This applies advantageously to the whole course of the guide surface in the feed direction (x direction). The course of the receiving device or of the storage layer when reading out the storage layer therefore corresponds—viewed at least in this direction perpendicular to the plane that is spanned by the support surface—exactly to the course of the storage layer lying on the support surface in the direction perpendicular to the plane of the support surface. In this way a uniform distance between the receiving device and storage layer and thus a good image sharpness can advantageously be ensured over the whole course of the storage layer. Two (partial) guide surfaces are advantageously provided, which are arranged on both sides of the support surface. In this way the guidance can be carried out particularly accurately.

In a particularly advantageous modification the two guide surfaces are directly connected, in particular integrally, to the support surface. In this way the matching of the course can be realised in a technically simple manner and a particularly good matching can be achieved.

Preferably the guide means comprises a bearing for supporting the receiving device, which in particular is formed as an air cushion that is arranged in such a way that during operation of the device an air gap is formed between the bearing and the guide surface. Devices according to the invention are for example used as digital X-ray scanners, which place extremely high demands on the constancy of the rate at which the storage layer is read out during the readout procedure. With the sliding bearings that are normally used the smooth course is destroyed on account of the friction effect, which cannot be completely prevented. Also, all types of roller bearings are not free of feedback.

Preferably the first and second partial guides are pretensioned against one another by at least one spring. In this way it can be ensured that if the guide means are not activated, in particular when using air cushions, the receiving device is firmly coupled to the reference surface since the counterforce generated by the air pressure, to the force generated by the spring is then (still) not dissipated. In this way damage, for example to the highly sensitive electronics, for example during transportation or accidental contact, is prevented. Furthermore a counterforce to the air pressure generated during operation can thereby be ensured in a particularly simple way.

It may be provided that the first and second partial guides are connected to one another by a rotating shaft running in the x direction. This constitutes an inexpensive and simple implementation of a connection according to the invention of the first and second partial guides.

Due to the fact that at least one air cushion is coupled via a point-like connection to the receiving device, a self-adjustment of the air gap is advantageously permitted. In this way friction can be prevented in a technically particularly simple and effective way.

In a further particularly advantageous implementation of the invention, the first and/or the second partial guides contain at least two sub-partial guides arranged behind one another in the x direction. In this way a tilting of the guide means in the feed direction can be particularly effectively prevented.

Viewed in the y direction, two partial guides are advantageously also provided, by means of which a distance can be adjusted in the y direction between the guide surface and the guide means. These two partial guides are in particular likewise joined to one another and are pretensioned against one another so that they act like pincers on the support surface. In this way particularly accurate guidance of the receiving device or of the storage layer can also be achieved in the y direction.

BRIEF DESCRIPTION OF THE DRAWINGS

Examples of implementation of the invention are described hereinafter with reference to the drawings, in which:

FIG. 4 is a partial sectional front view of FIG. 3a;

DETAILED DESCRIPTION OF THE INVENTION

Figure 1:
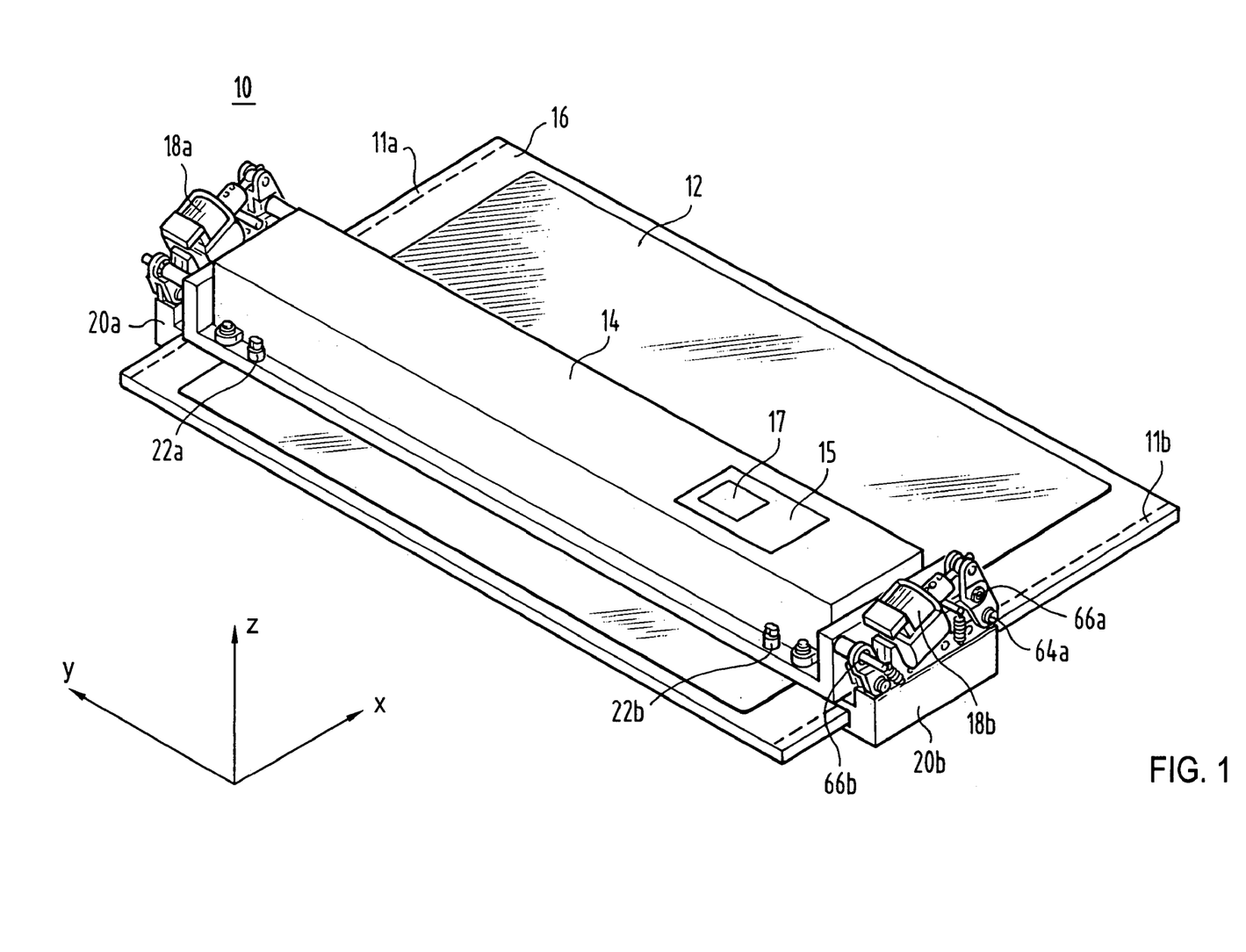
FIG. 1 is a diagrammatic perspective view of a first embodiment of a device according to the invention for reading out information stored in a storage layer.

FIG. 1 shows a digital scanner 10 for X-ray applications as a device according to the invention for reading out information stored in a storage layer 12 that is arranged on a support surface 16. The support surface 16 spans an x-y plane. A z direction runs perpendicular to this x-y plane. The scanner 10 comprises a scanning head 14 in which is arranged a receiving device for receiving emission radiation emitted from the storage layer 12. The receiving device may contain a CCD cell with imaging optics connected upstream. A radiation device for transmitting an excitation radiation is likewise arranged in the scanning head 14, or in a transmitted light scanner underneath the support surface 16. The radiation source may comprise a plurality of laser diodes arranged next to one another, whose radiations are guided via optical systems to the storage layer 12, whereby a line of the storage layer 12 can be excited. The scanning head 14 is connected via a first and a second adjustment unit 18a, 18b to a first and a second bearing device 20a, 20b, with which the scanning head 14 is guided on the support surface 16. The two bearing devices 20a, 20b are in this connection arranged in two edge regions 11a and 11b of the support surface 16. In this way it is ensured that the course of the edge regions 11a, 11b in the z direction coincides exactly with the course of the support surface 16. The respective level in the z direction of the edge regions 11a, 11b coincides with the level in the z direction of the support surface 16. During a readout procedure the scanning head 14, driven by a drive device not shown here, is guided in the x direction over the storage layer 12. The support surface 16 is here preferably made of glass. The glass surface may be made particularly smooth and thereby ensures a particularly exact guidance of the scanning head 14. FIG. 1 furthermore shows a control means 15 that serves to control the readout of the storage layer 12 by means of the scanner 10. The control means 15 is here mounted on the scanning head 14 and contains a memory 17 in which various information required for the readout is stored and which can be accessed by the control means 15 as necessary. The significance of a first and second callipers 22a 22b is discussed in more detail hereinbelow. In this connection it is of course possible to use only one precision calliper instead of two precision callipers.

Figure 2A:
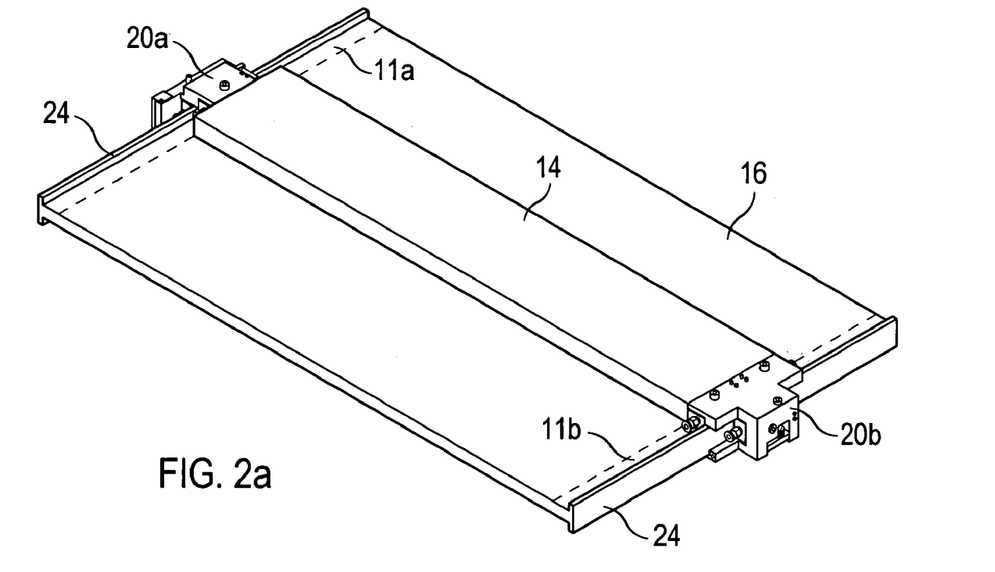
FIGS. 2a–2c illustrate a second embodiment of a device according to the invention after successive dismantling of parts of the device according to the invention.
Figure 2B:
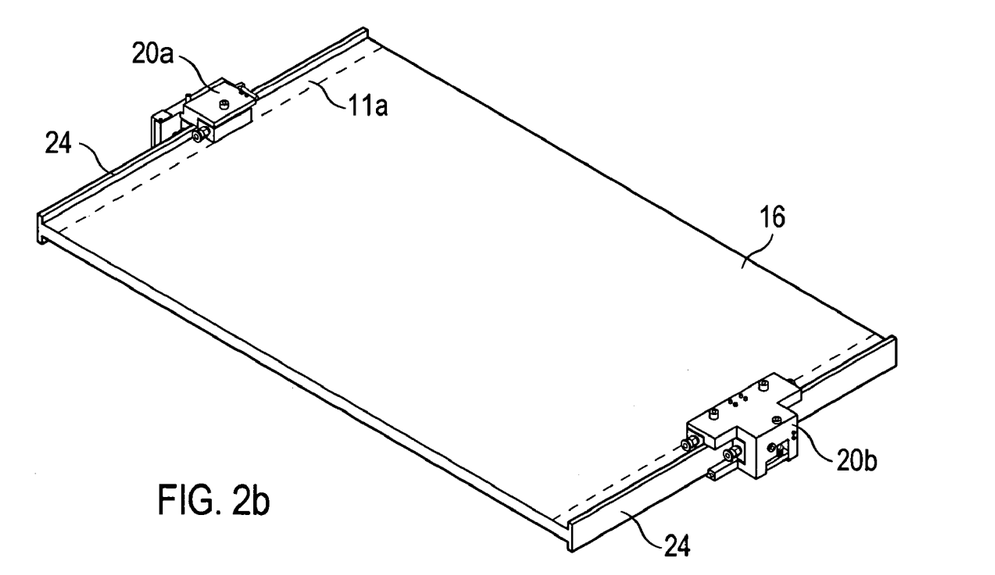
Figure 2C:
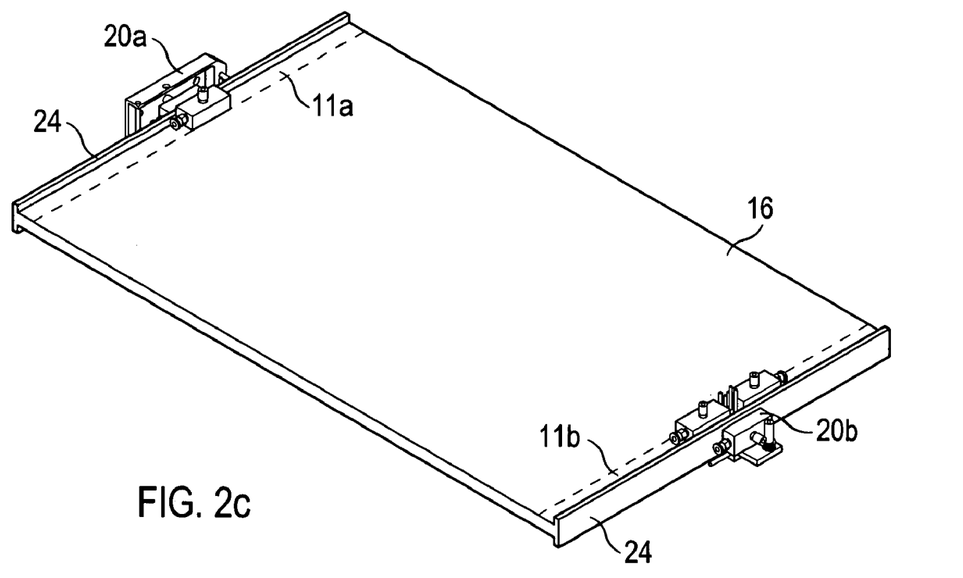

FIGS. 2a to 2c show a construction of the device according to the invention, in which the support surface 16 has pronounced edge rims 24 at the two ends in the y direction to provide a particularly simple bearing and guidance of the scanning head 14 relative to the support surface 16. These edge rims 24 serve to guide the scanning head 14 in the y direction. FIG. 2a shows the scanning head 14 after removal of its cover cap. The adjustment units 18a, 18b have likewise been removed and are thus not shown. FIG. 2b shows the arrangement of FIG. 2a without the scanning head 14, while FIG. 2c shows the arrangement of FIG. 2b in which the housing coverings of the left-hand and right-hand bearing device 20a, 20b have been removed.

Figure 3A:
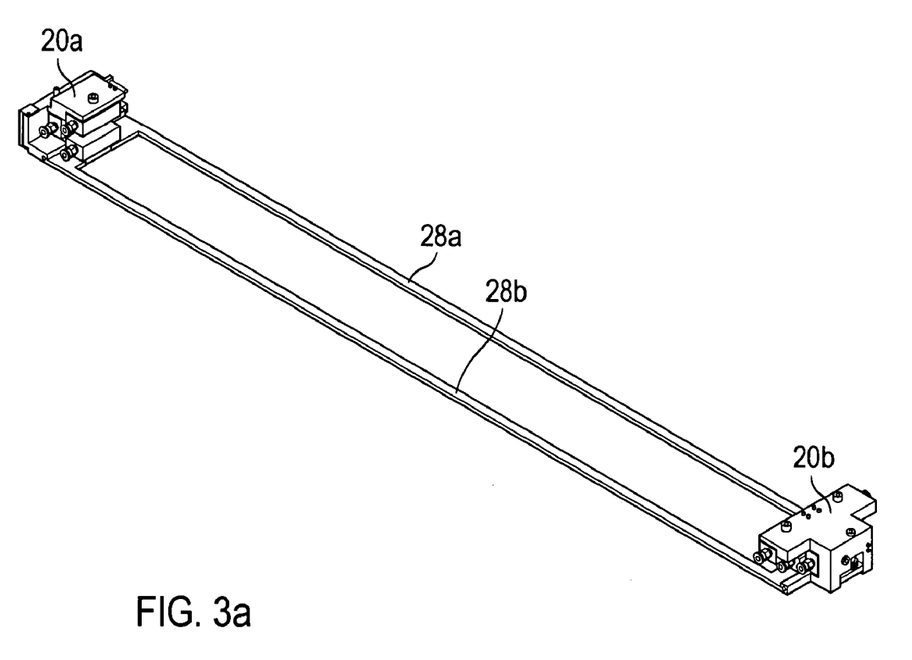
FIGS. 3a–3d illustrate the bearing of the receiving device of FIG. 2b.
Figure 3B:
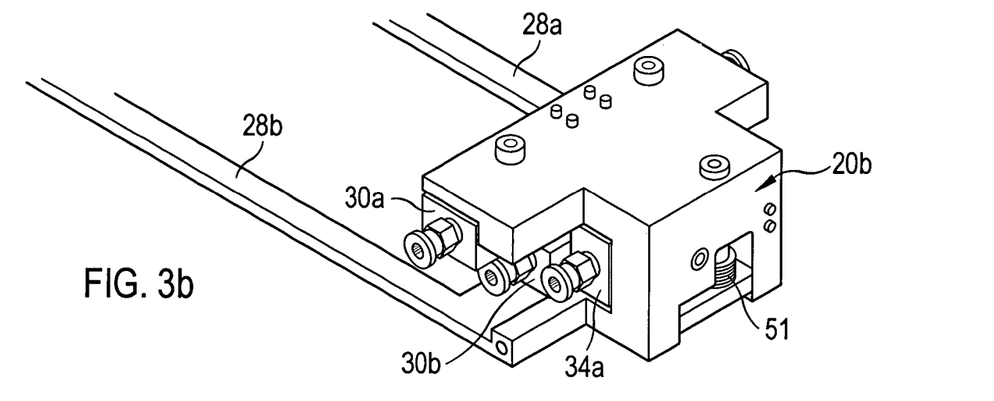
Figure 3C:
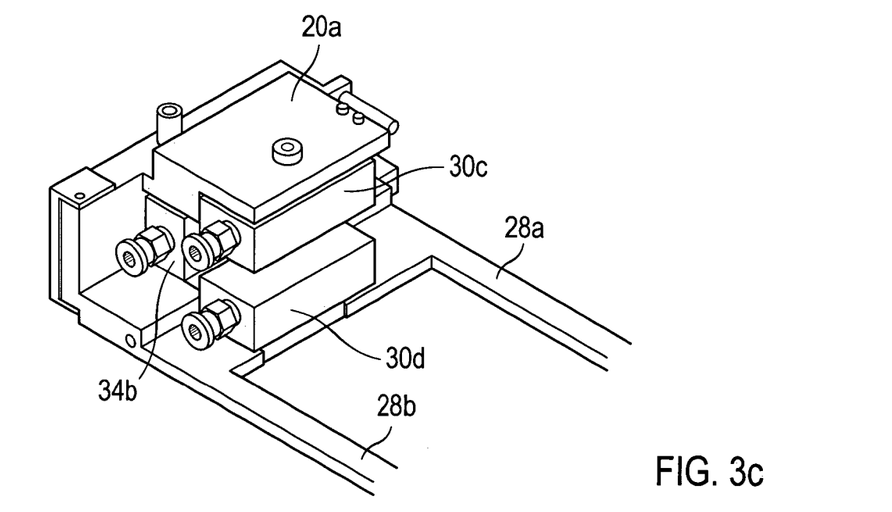
Figure 3D:
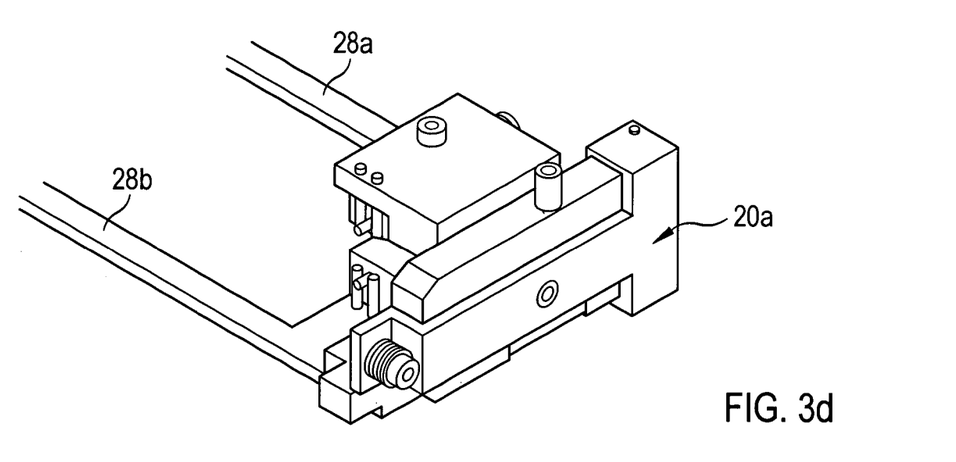

FIG. 3a corresponds to the view of FIG. 2b, in which however the support surface 16 has been removed from the drawing. It can be seen that the left-hand and the right-hand bearing device 20a, 20b are joined to one another via two webs 28a, 28b. FIG. 3b shows the right-hand bearing device 20b and FIG. 3c shows the left-hand bearing device 20a of FIG. 3a in detail. A rear view of the left-hand bearing device 20a is shown in FIG. 3d.

Figure 4:
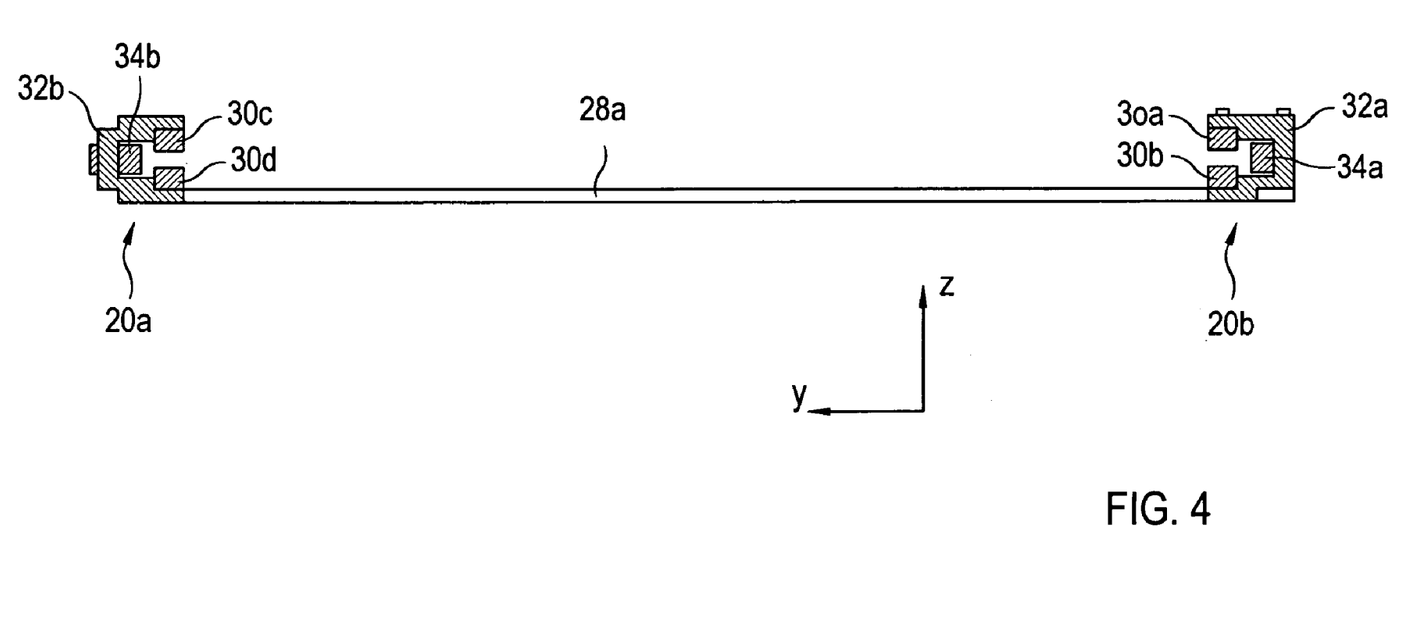

FIG. 4 shows diagrammatically a partial sectional front view of the representation of FIG. 3a, from which it can be seen that the bearing devices 20a and 20b involve two air cushions 30a, 30b and 30c, 30d that co-operate in the z axial direction. Via a connection 32a of the right-hand bearing device 20b and via a connection 32b of the left-hand bearing device 20a their respective air cushions 30a, 30b and 30c, 30d are pretensioned against one another in a spring-like manner in the z axial direction. Forces to effect the pretensioning may be produced for example by means of disc springs that act on the connections 32a and 32b. The air pressure generated in each case during operation by the air cushions produces counterforces to the forces generated by the disc springs. In the y direction two air cushions 34a, 34b co-operate in the sense of a bearing and a counterbearing. The air cushions 34a, 34b in the y direction are likewise pretensioned against one another in a spring-like manner. The support surface 16 on which the various air cushions rest is clamped as if between pincers by the pair of air cushions.

Figure 5A:
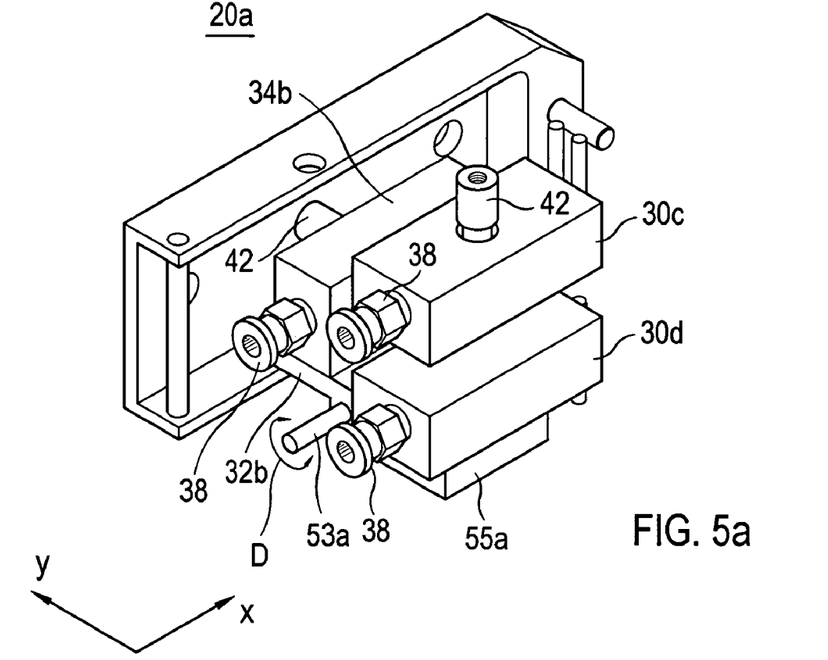
FIGS. 5a, b are detailed views of details of FIG. 3b.
Figure 5B:
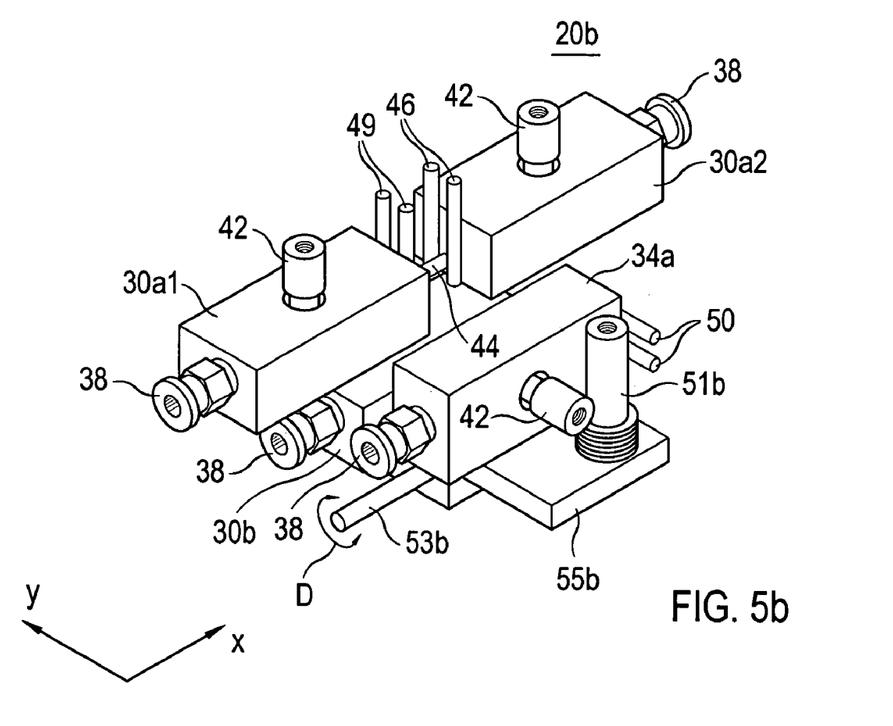
Figure 6A:
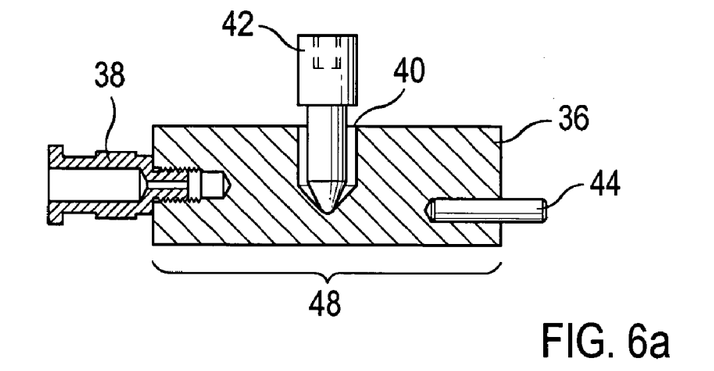
FIG. 6 is a detailed view of a preferably used air cushion.

FIG. 5a shows the air cushions 30c, 30d and 34b of the left-hand bearing device 20a, and FIG. 5b shows the air cushions 30a1, 30a2, 30b and 34a of the right-hand bearing device 20b with a greater degree of accuracy. One of the air cushions that is used is shown in a representational manner in FIGS. 6a to c, without specifying its installation site in one of the bearing devices 20a, 20b, generally identified by the reference numeral 36. The air cushion 36 comprises an air connection 38 as well as a bearing 40, in which for example a conical screw 42 is arranged to produce a point-like bearing, which screw is to be rigidly connected to the associated housing covering of the respective bearing device 20a, 20b and thus with the scanning head 14 to be supported. For this purpose the head of the conical screw 42 is provided with a thread. A self-adjusting bearing is achieved by the point-like bearing via the tip of the conical screw 42.

Figure 6B:
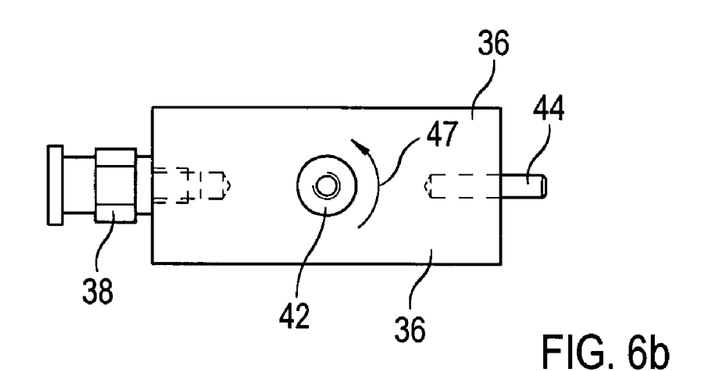
Figure 6C:
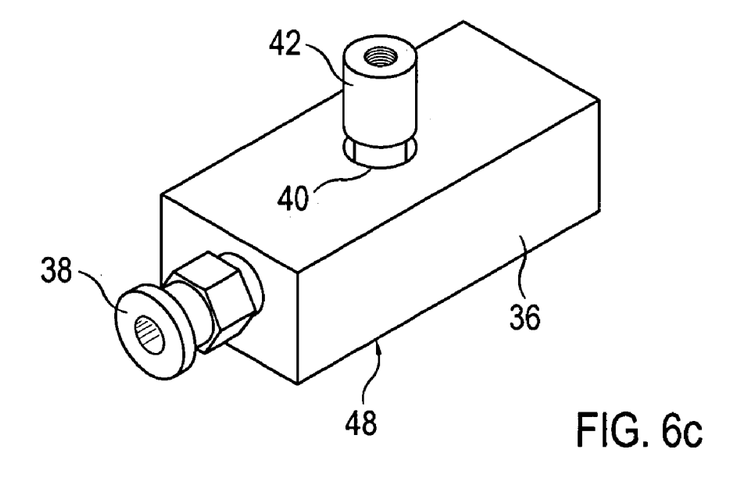

FIG. 6b shows a plan view of the air cushion 36. An anti-torsion device 44 is arranged in the air cushion 36 in order to prevent the air cushion 36 rotating in the direction identified by the arrow 47 in FIG. 6b. The air outlet side of the air cushion 36 is identified by the reference numeral 48. This contains air outflow openings through which the air introduced into the bearing via the air connection 38 is blown out.

Returning now to the representation shown in FIG. 5b, it can be seen that the upper air cushion 30a (see FIG. 4) in this case includes two air cushions 30a1, 30a2 that are arranged adjacent to one another in the x direction. In this way it is ensured that the scanning head 14 does not tilt about the y axis during the activation of the air cushions. Here, anti-torsion devices 46 for the air cushion 30a2, anti-torsion devices 49 for the air cushion 30a1 and anti-torsion devices 50 for the air cushion 34a correspond to the anti-torsion device 44 generally described above. The anti-torsion devices 46, 49, 50 are secured at their respective ends shown in FIG. 5b to the housing covering (not shown) of the bearing device 20b. The conical screws 42 of FIGS. 5a, 5b are connected to one another via the connections 32a 32b, to the bearing and counterbearing, and are also connected to the scanning head 14.

FIG. 5b shows in addition a disc spring 51b that serves to generate a force for producing a pretensioning of the pair of air cushions 30a1, 30a2 and 30b in the z direction. The disc spring 51b is provided on its upper side with a thread via which the disc spring 51b can be secured to the housing covering of the bearing device 20b (see also the diagram in FIG. 3b). The force generated by the disc spring 51b is transmitted here via a connecting plate 55b to the air cushion 30b that is joined to the connecting plate 55b. The connecting plate 55b is in this connection connected to a rotating shaft 53b running in the x direction, the shaft permitting a tilting of the connecting plate 55b and thus of the air cushion 30b along a rotation direction D. The rotating shaft 53b is secured at both ends to the housing (not shown) of the bearing device 20b. The air pressures generated by the air cushions 30a1, 30a2 and 30b in operation form a counter-force to the force generated by the disc spring 51b. In this way a pincer-like bearing of the support surface 16 that is located between the bearings 30a1, 30a2 and 30b is produced. A further disc spring (not shown) corresponding to the disc spring 51b, a connecting plate 55a as well as a rotating shaft 53a are provided for the bearing device 20a in order also to ensure the pincer-like bearing of the support surface 16.

Figure 7A:
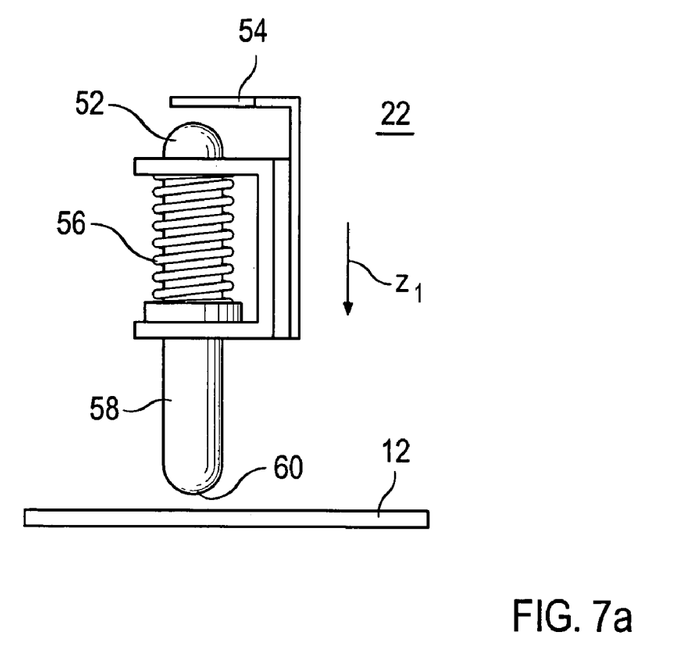
FIGS. 7a, b illustrate a side view and perspective view of a precision calliper preferably used in the device according to the invention.
Figure 7B:
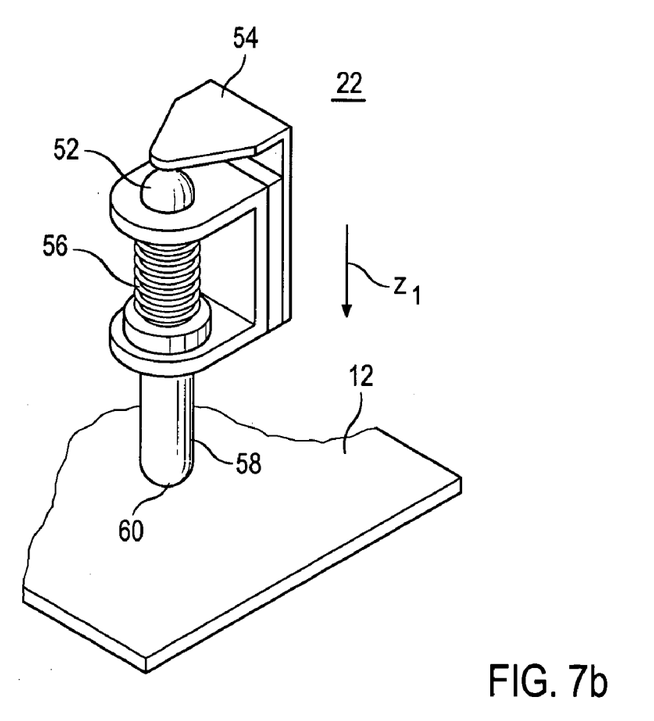

FIGS. 7a and 7b show an embodiment of the precision calliper 22 already illustrated in FIG. 1. The precision calliper 22 is connected to the scanning head 14, in which connection it may advantageously be provided that the precision calliper is displacedly arranged in the y direction. In order to scale the distance between the storage layer 12 and the receiving device contained in the scanning head 14, the scanning head 14, which is connected to the precision calliper 22, is lowered in the $z_1$ direction, i.e. in the direction of the storage layer 12, until an upper side 52 of a contact pin 58 comes into contact with a contact spring 54. In this case a lower side 60 of the contact pin 58 is in contact with the storage layer 12. A spring 56 ensures that, without corresponding pressure on the lower side 60 of the contact pin 58, i.e. without resistance due to the storage layer 12, the upper side 52 of the contact pin 58 and the contact spring 54 are not in contact. After a scaling carried out in the aforedescribed manner, an optimal distance between the storage layer 12 and receiving device of the scanning head 14 is adjusted by means of the adjustment unit 18 shown in FIG. 8, by retracting the scanning head 14 by the optimal distance in the opposite $z_1$ direction, after the head has come into contact with the contact spring 54 through the upper side 52 of the contact pin 58. In this way an interspacing is formed between the lower side 60 of the contact pin 58 and the storage layer 12. The adjustment of the optimal distance is controlled for the sake of simplicity by the control means 15 (FIG. 1). The optimal distance may have been determined by a previously executed calibration of the scanner. The adjustment of the optimal distance ensures in particular that the image sharpness during the readout of the storage layer 12 is extremely good and is uniform as far as possible over the whole area of the storage layer 12.

Figure 8:
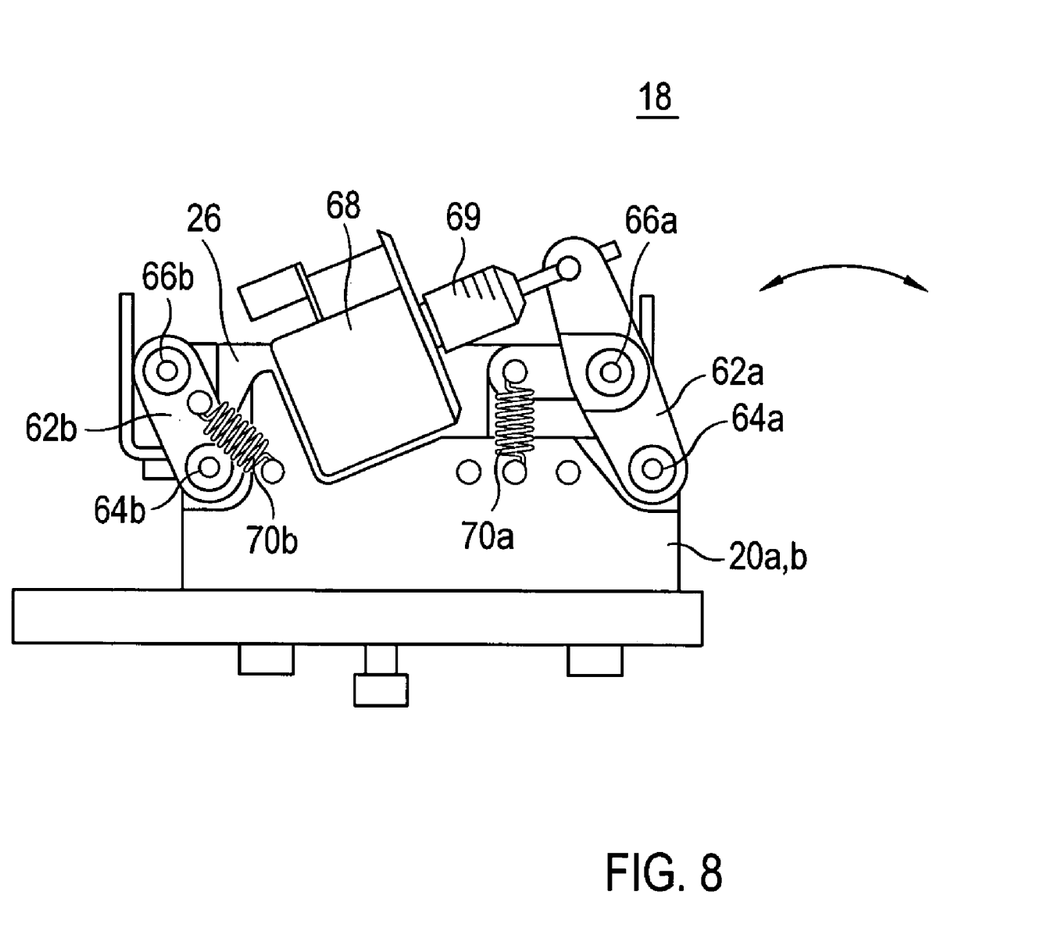
FIG. 8 is a detailed view of an adjustment unit that can be preferably used.

With reference to FIG. 8, the adjustment unit 18 comprises two rods 62a 62b guided in parallel, which on the one hand are coupled via bearings 64a, 64b to one of the bearing devices 20a, 20b, and on the other hand are coupled via bearings 66a, 66b to the scanning head 14. The rod 62a can be deflected by a stepping motor 68 with integrated spindle 69, this movement being transmitted as a corresponding deflection to the rod 62b. In this way the distance between the storage layer 12 and receiving device, i.e. scanning head 14, can be very precisely adjusted. Springs 70a, 70b provide for a clamping of the adjustment unit 18 that is as far as possible free from play.

Such a distance adjustment may be carried out for different storage layers in each case before beginning a readout procedure, the distance advantageously being maintained constant during the readout procedure. This improves the readout quality since different storage layers, due to production conditions, have in particular different thicknesses, which means that with different storage layers 12 there would be different distances between the surface of the respective storage layer 12 and the receiving device contained in the scanning head 14. The distance may advantageously be finely adjusted during a readout procedure. For the sake of simplicity this is performed by means of the control means 15. It is advantageous, particularly for the implementation of the last-mentioned variant, if the distance is constantly measured during a scanning procedure. A mechanical scanning by means of a measuring wheel for example is suitable for this purpose; the wheel runs with a minimal bearing force on the surface of the storage layer 12 during the scanning process and transmits the level of the storage layer to a measuring system. Alternatively, a contact-less distance measuring device may also be used, in which connection however care should be taken to ensure that the storage layer is not thereby excited to emit radiation.

It may be envisaged that, for repeated readout procedures of the same storage layer 12, the result of the previously executed scaling or distance measurement be recorded in a memory 17 (see FIG. 1) and allocated to the storage layer. This can be realised in a particularly advantageous manner if the storage layer 12 is mounted in a cassette and this cassette has access to such a memory. In order to read out the storage layer 12 contained in the cassette, the latter is inserted into the scanner according to the invention and the storage layer 12 is then removed from the cassette and inserted into the scanner. The result of the previously executed distance measurement or scaling stored in the memory can for the sake of simplicity be transmitted by a transponder to the device according to the invention for the readout of the information from the storage layer. It is however also possible to store the result of the previously executed distance measurement or scaling in the memory 17 of the scanner after the execution of the procedure. After re-identifying the associated storage layer, the stored distance from the scanning head 14 to the support surface 16 can be accessed and adjusted.

Figure 9:
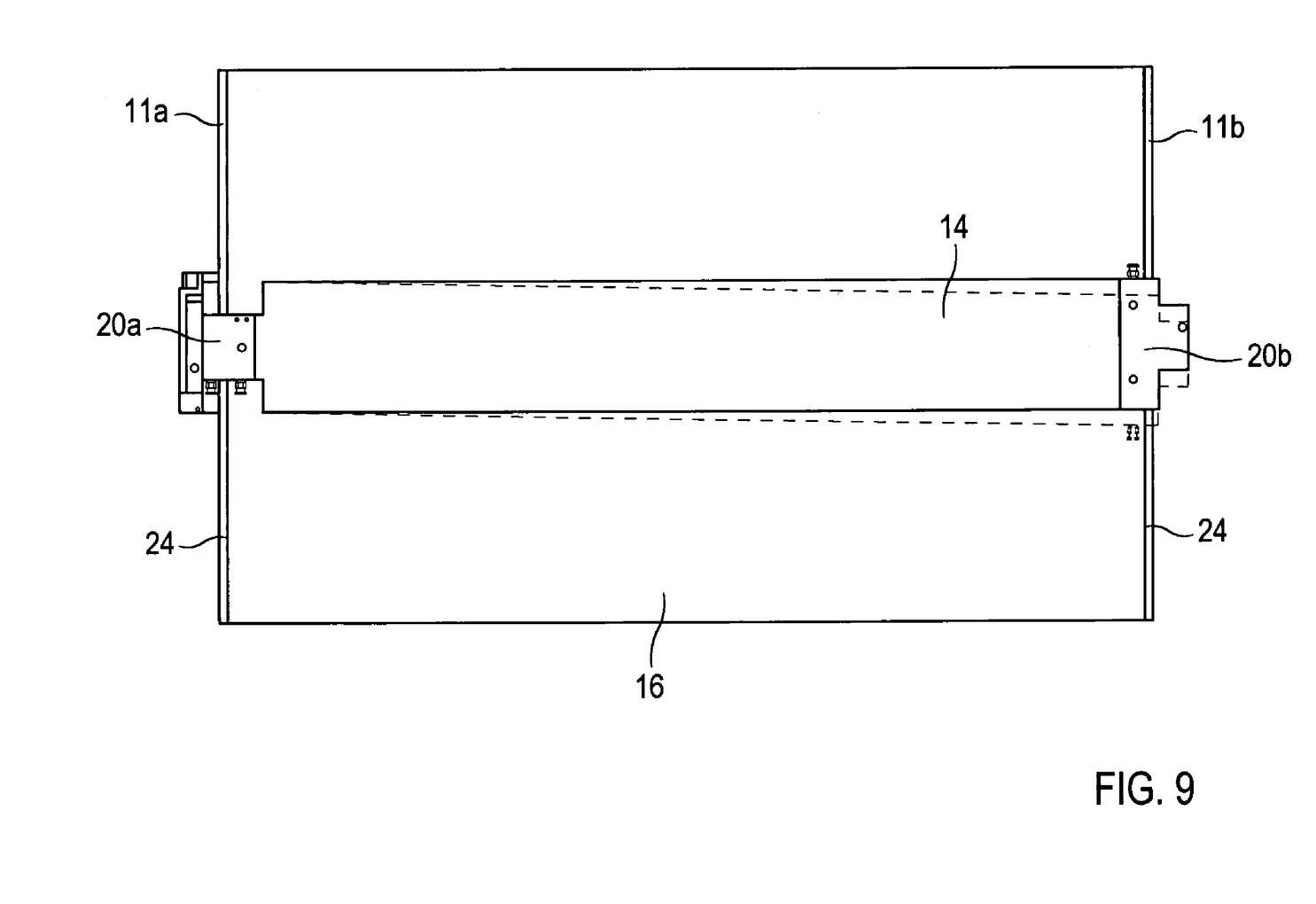
FIG. 9 is a diagrammatic view of the oscillatory movements of the receiving device made possible by the use of air cushions, illustrated for example by oscillations about the z axis.

FIG. 9 shows that an oscillation of the scanning head 14 about the z axis is made possible by the use of air cushions, without resulting in a slip-stick effect. In this way the device according to the invention is particularly suitable also for a bilateral drive of the receiving device.

The device according to the invention can also be used in variants in which the storage layer 12 and the support surface 16 are securely mounted in the device. It can also be used in a variant in which the storage layer 16, possibly mounted on an additional carrier layer, for example aluminium, is introduced into the device simply to readout the storage layer 12.

In the case where it is signaled, via a transponder associated with the storage layer, that no scaling or distance measurement has yet been carried out for the corresponding storage layer, it may be envisaged that this be initiated automatically by the readout device according to the invention.

The foregoing description of the present invention has been presented for purposes of illustration and description. It is not intended to be exhaustive or to limit the invention to the precise form disclosed, and many modifications and variations are possible in light of the above teaching. Such modifications and variations that may be apparent to a person skilled in the art are intended to be included within the scope of this invention.

What is claimed is:

1. Device for reading out information stored in a storage layer, comprising:
   a receiving device for receiving an emission radiation emitted from the storage layer;
   a support surface for supporting the storage layer, wherein an x-y plane is defined by the support surface; and
   a guide means for guiding the receiving device or the storage layer on a guide surface during the execution of a relative movement between the receiving device and the storage layer in the x direction, in which the guide means comprises a first partial guide for achieving an interspacing in a z direction that lies perpendicular to the x-y plane, between the guide surface and the guide means, and a second partial guide for achieving an interspace in the z direction, and the first partial guide is arranged—viewed in the z direction—on one side of the support surface and the second partial guide is arranged—viewed in the z direction—on the other side of the support surface; wherein the guide surface is independent of the storage layer, and the first partial guide and the second partial guide are connected to one another and are pretensioned against one another so that they act like pincers on the support surface.

2. Device according to claim 1, wherein the level of the guide surface in the z direction coincides with the level of the support surface in the z direction, and the guide surface has two partial guide surfaces that are arranged in the y direction on both sides of the support surface.

3. Device according to claim 2, wherein the partial guide surfaces are connected to the support surface.

4. Device according to claim 3, wherein the partial guide surfaces are integrally connected to the support surface.

5. Device according to claim 1, wherein the guide surface has a glass surface.

6. Device according to claim 1, wherein the guide means comprise a bearing for supporting the receiving device.

7. Device according to claim 1, wherein the first partial guide and the second partial guide are pretensioned against one another by means of at least one spring.

8. Device according to claim 1, wherein the first partial guide and the second partial guide are connected to one another via a rotating shaft running in the x direction.

9. Device according to claim 1, wherein the first partial guide and the second partial guide each comprise at least one air cushion.

10. Device according to claim 9, wherein at least one air cushion is coupled via a point-like connection to the receiving device.

11. Device according to claim 1, wherein the first partial guide or the second partial guide comprises at least two sub-partial guides arranged behind one another in the x direction.

12. Device according to claim 1, wherein the first partial guide and the second partial guide are in each case—viewed in the y direction—provided on both sides of the support surface.

13. Device according to claim 1, further comprising: a third partial guide for achieving an interspacing in the y direction, and a fourth partial guide for achieving an interspacing in the y direction, wherein the third partial guide—viewed in the y direction—is arranged on one side of the support surface, and the fourth partial guide—viewed in the y direction—is arranged on the other side of the support surface.

14. Device according to claim 13, wherein the third partial guide and the fourth partial guide are connected to one another and are pretensioned against one another so that they act like pincers on the support surface.

15. Method for reading out information stored in a storage layer using a receiving device for receiving emission radiation that has been emitted from the storage layer, wherein the storage layer is located on a support surface that is defined by an x-y plane, said method comprising:
   a) reception of an emission radiation emitted from the storage layer;
   b) generation of a relative movement between the receiving device and the storage layer in the x direction; and
   c) guidance of the receiving device or of the storage layer during the generation of relative movement by means of a guide means, on a guide surface, wherein by means of a first partial guide a distance is adjusted in a z direction that lies perpendicular to the x-y plane, on one side—viewed in the z direction—of the support surface, and by means of a second partial guide a distance is adjusted in the z direction on the other side—viewed in the z direction—of the support surface, wherein the guide surface is independent of the storage layer, and the first partial guide and the second partial guide are connected to one another and pretensioned against one another, and act like pincers on the support surface.

* * * * *